(12) United States Patent
Katou et al.

(10) Patent No.: US 9,885,889 B2
(45) Date of Patent: Feb. 6, 2018

(54) OPTICAL MODULATOR

(71) Applicant: SUMITOMO OSAKA CEMENT CO., LTD., Tokyo (JP)

(72) Inventors: Kei Katou, Tokyo (JP); Norikazu Miyazaki, Tokyo (JP); Ryo Shimizu, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/468,117

(22) Filed: Mar. 24, 2017

(65) Prior Publication Data

US 2017/0276974 A1    Sep. 28, 2017

(30) Foreign Application Priority Data

Mar. 25, 2016  (JP) .................................. 2016-061199

(51) Int. Cl.
| | |
|---|---|
| *G02F 1/035* | (2006.01) |
| *G02F 1/03* | (2006.01) |
| *G02F 1/225* | (2006.01) |
| *G02F 1/21* | (2006.01) |

(52) U.S. Cl.
CPC .......... *G02F 1/0327* (2013.01); *G02F 1/0316* (2013.01); *G02F 1/225* (2013.01); *G02F 2001/212* (2013.01); *G02F 2201/58* (2013.01)

(58) Field of Classification Search
CPC ...... G02F 1/225; G02F 2001/212; G02F 1/01; G02F 1/035; G02F 1/0327; G02B 6/12007
See application file for complete search history.

(56) References Cited

U.S. PATENT DOCUMENTS 8,964,082 B2 *   2/2015   Yamada ................. H04N 5/335
                                                  348/308
2017/0082810 A1 *  3/2017   Daikuhara ........... G02B 6/4292

FOREIGN PATENT DOCUMENTS

| JP | 2013080009 A | * | 5/2013 |
|---|---|---|---|
| JP | 2015138145 | | 7/2015 |
| JP | 2015194517 | | 11/2015 |
| JP | 2015197451 | | 11/2015 |

* cited by examiner

*Primary Examiner* — Jennifer Doan
(74) *Attorney, Agent, or Firm* — JCIPRNET

(57) ABSTRACT

An optical modulator includes a first optical modulation section and a second optical modulation section which use modulation signals different from each other when applying a modulation signal to the modulation electrode and performing optical modulation. In addition, a light-receiving element is disposed on a substrate, and the light-receiving element has a first light-receiving section that detects optical signal propagating from a first waveguide which guides the optical signal output from the first optical modulation section. In addition, the light-receiving element also has a second light-receiving section that detects an optical signal propagating through a second waveguide which guides the optical signal output from the second optical modulation section.

7 Claims, 6 Drawing Sheets

OPTICAL MODULATOR

CROSS-REFERENCE TO RELATED APPLICATION

This application claims the priority benefit of Japan application serial no. 2016-061199, filed on Mar. 25, 2016. The entirety of the above-mentioned patent application is hereby incorporated by reference herein and made a part of this specification.

BACKGROUND OF THE INVENTION

Field of the Invention

The present invention relates to an optical modulator, and particularly, to an optical modulator including a substrate having an electro-optic effect, an optical waveguide that is formed in the substrate, and a modulation electrode for modulating a light wave that propagates through the optical waveguide.

Description of Related Art

In an optical communication field or an optical measurement field, various kinds of optical modulator such as an intensity modulator and a phase modulator, which includes a Mach-Zehnder type optical waveguide, have been used. An intensity variation of light, which is output from the Mach-Zehnder type optical waveguide, shows, for example, sinusoidal function characteristics with respect to a voltage that is applied to a modulation electrode. It is necessary to set a modulation signal, which is applied to the modulation electrode, to an appropriate operation bias point so as to obtain an optimal intensity of output light in accordance with a usage of the optical modulator.

According to this, in the related art, monitoring of an intensity state of output light of the optical modulator has been performed by detecting a part of an optical signal, which is output from the optical modulator, or radiated light that is radiated from a multiplexing section of the Mach-Zehnder type optical waveguide, as monitoring light with a light-receiving element such as an optical detector. In addition, an operation bias point of the modulation signal, which is applied to the modulation electrode, is adjusted (bias-controlled) on the basis of a detected value (monitoring output) of the light-receiving element.

With regard to the optical modulator as described above, various inventions have been suggested before now.

For example, Japanese Laid-open Patent Publication No. 2015-194517 discloses an optical modulator configured to suppress a decrease in a frequency band of a light-receiving element even in a case where two kinds of radiated light from the multiplexing section of the Mach-Zehnder type optical waveguide are simultaneously received and are monitored. In addition, Japanese Laid-open Patent Publication No. 2015-138145 discloses an optical modulator configured to enhance light-receiving sensitivity of the light-receiving element and to suppress a decrease in the frequency band of the light-receiving element even in a case where the light-receiving element is disposed on a substrate. In addition, Japanese Laid-open Patent Publication No. 2015-197451 discloses an optical modulator configured to minimize noise such as electrical crosstalk from being incorporated into a detected signal output from the light-receiving element.

SUMMARY OF THE INVENTION

Along with the high capacity required for communications in recent years, an optical modulator having a structure, in which a plurality of optical modulation sections are provided in one substrate and optical modulation is performed by applying a modulation signal different for each of the optical modulation sections to the modulation electrode, has been developed. In addition, a multi-element structure optical modulator, which includes a plurality of substrates respectively provided with a plurality of optical modulation sections, has also been developed. The optical modulator has a configuration in which a plurality of light-receiving elements are disposed in each of the substrates and monitoring light is detected for each of the optical modulation sections so as to independently perform a bias control for a modulation signal in each of optical modulation sections.

On the other hand, in accordance with a demand for a reduction in size of the optical modulator, a reduction in size of a substrate that constitutes the optical modulator is in progress. However, when disposing a plurality of light-receiving elements in the substrate, an increase in the substrate size is caused, and this increase becomes problematic in progress of the reduction in size of the substrate.

The invention provides an optical modulator in which an increase in size of a substrate is suppressed in a case of performing optical modulation by applying a modulation signal, which is different for each of a plurality of optical modulation sections provided in one substrate, to a modulation electrode.

An optical modulator of the invention has the following technical characteristics.

(1) According to an aspect of the invention, there is provided an optical modulator including a substrate having an electro-optic effect, an optical waveguide that is formed in the substrate, and a modulation electrode for modulating a light wave that propagates through the optical waveguide. A first optical modulation section and a second optical modulation section use modulation signals different from each other when applying a modulation signal to the modulation electrode and performing optical modulation. A light-receiving element is disposed on the substrate. The light-receiving element has a first light-receiving section that detects an optical signal propagating through a first waveguide which guides the optical signal output from the first optical modulation section, and a second light-receiving section that detects an optical signal propagating through a second waveguide which guides the optical signal output from the second optical modulation section.

(2) In the optical modulator according to (1), the first waveguide and the second waveguide may be formed in such a manner that an interval between the waveguides becomes narrower until reaching a region of the first light-receiving section and the second light-receiving section.

(3) In the optical modulator according to (1) or (2), in the first waveguide and the second waveguide, a width of waveguide in a region of the first light-receiving section and the second light-receiving section may be greater than a width of waveguide before reaching the region.

(4) In the optical modulator according to any one of (1) to (3), in the substrate, any one of a groove, a slab waveguide, a metal member, and an electrode may be formed between the first waveguide and the second waveguide so as to prevent optical crosstalk between the first waveguide and the second waveguide.

(5) In the optical modulator according to any one of (1) to (4), a mark for arranging the light-receiving element at a predetermined position on the substrate may be formed on at least one of the light-receiving element and the substrate.

(6) In the optical modulator according to any one of (1) to (5), the first optical modulation section and the second optical modulation section may be configured by using at least one Mach-Zehnder type optical waveguide, and the first optical modulation section and the second optical modulation section may be arranged in parallel to each other.

(7) In the optical modulator according to any one of (1) to (6), the first waveguide may be formed to extract a part of an optical signal output from an output waveguide guiding the optical signal that is modulated in the first optical modulation section, and to derive the extracted optical signal toward the first light-receiving section, and the second waveguide may be formed to extract a part of an optical signal output from an output waveguide guiding the optical signal that is modulated in the second optical modulation section, and to derive the extracted optical signal toward the second light-receiving section.

The optical modulator according to the aspect of the invention includes a substrate having an electro-optic effect, an optical waveguide that is formed in the substrate, and a modulation electrode for modulating a light wave that propagates through the optical waveguide. A first optical modulation section and a second optical modulation section use modulation signals different from each other when applying a modulation signal to the modulation electrode and performing optical modulation. A light-receiving element is disposed on the substrate. The light-receiving element has a first light-receiving section that detects an optical signal propagating through a first waveguide which guides the optical signal output from the first optical modulation section, and a second light-receiving section that detects an optical signal propagating through a second waveguide which guides the optical signal output from the second optical modulation section. Accordingly, in a case of performing optical modulation by applying a modulation signal, which is different for each of a plurality of optical modulation sections provided in one substrate, to the modulation electrode, it is possible to provide an optical modulator in which an increase in a substrate size is further suppressed in comparison to a case where the light-receiving element is provided for each of the optical modulation sections.

DETAILED DESCRIPTION OF THE INVENTION

Hereinafter, an optical modulator according to the invention will be described in detail.

Figure 1:
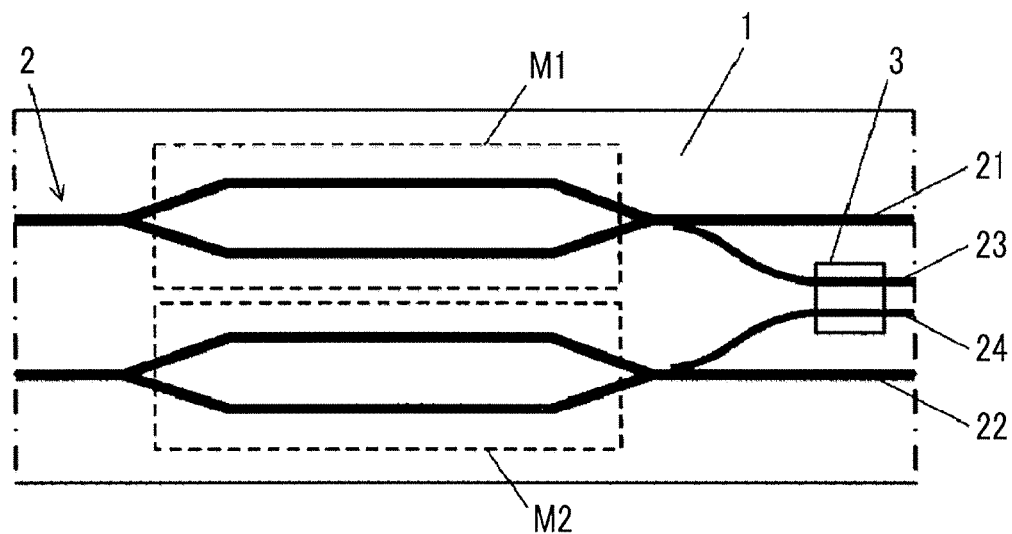
FIG. 1 is a plan view illustrating an optical modulator according to an example of the invention.
Figure 2:
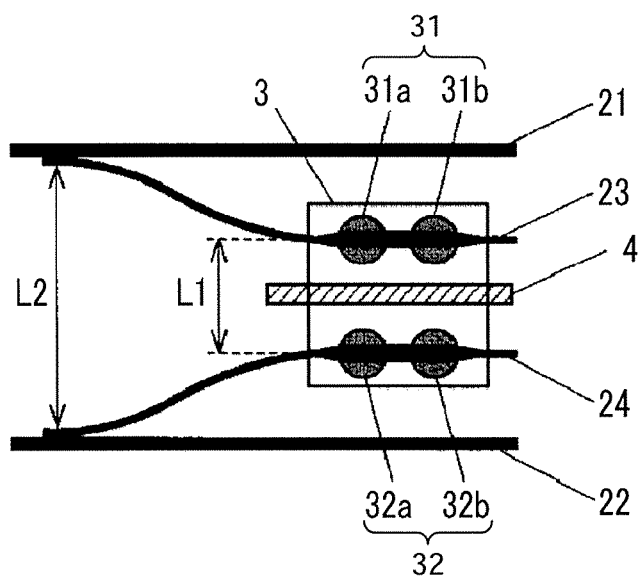
FIG. 2 is an enlarged plan view of a light-receiving element portion in FIG. 1.

FIG. 1 is a plan view illustrating an optical modulator according to an example of the invention. FIG. 2 is an enlarged plan view of a light-receiving element portion in FIG. 1.

As illustrated in FIG. 1 and FIG. 2, the optical modulator of the invention relates to an optical modulator including a substrate 1 having an electro-optic effect, an optical waveguide 2 that is formed in the substrate, and a modulation electrode (not illustrated) for modulating a light wave that propagates through the optical waveguide.

The optical modulator includes at least a first optical modulation section M1 and a second optical modulation section M2 which use modulation signals different from each other when applying a modulation signal to the modulation electrode and performing optical modulation. In addition, a light-receiving element 3 is provided in the substrate, and the light-receiving element 3 has a first light-receiving section 31 (31a, 31b) that detects an optical signal propagating through a first waveguide 23 which guides the optical signal output from the first optical modulation section M1. In addition, the light-receiving element 3 has a second light-receiving section 32 (32a, 32b) that detects an optical signal propagating through a second waveguide 24 which guides the optical signal output from the second optical modulation section M2.

Examples of the substrate 1 include a substrate such as quartz and a semiconductor in which an optical waveguide can be formed, and a substrate that has an electro-optic effect and uses anyone single crystal in lithium niobate ($LiNbO_3$), lithium tantalate ($LiTaO_3$), and lead lanthanum zirconate titanate (PLZT), and the like.

For example, the optical waveguide 2, which is formed in the substrate, is formed by thermally diffusing a high-refractive-index material such as titanium (Ti) on a $LiNbO_3$ substrate (LN substrate). In addition, it is possible to use a rib-type optical waveguide in which a groove is formed on both sides of a portion that becomes an optical waveguide, or a ridge-type waveguide in which an optical waveguide portion is formed in a convex shape. In addition, the invention is also applicable to an optical circuit in which an optical waveguide is formed in substrates such as PLCs different from each other, and the substrates are joined and integrated.

The modulation electrode is constituted by a signal electrode or a ground electrode, and is formed by a gold plating method in which an electrode pattern of Ti and Au is formed on a substrate surface, and the like. In addition, a buffer layer such as dielectric $SiO_2$ may be provided on the substrate surface after forming the optical waveguide as necessary. Furthermore, when forming the buffer layer in a region that guides an optical signal, which propagates through the inside of the substrate 1 (optical waveguide 2), to a light-receiving element 3 side, it is difficult to effectively guide the optical signal. Accordingly, it is preferable not to form the buffer layer in the region. In addition, in a case of disposing the light-receiving element 3 through the buffer layer, it is preferable that the thickness of the buffer layer in the region in which the light-receiving element 3 is disposed is made to be smaller than the thickness of other regions so as to secure light-receiving sensitivity.

The light-receiving element 3 may be brought into direct contact with the optical waveguide 2, but it is preferable to form a high-refractive-index film on the optical waveguide 2 and to dispose the light-receiving element 3 on the high-refractive-index film so as to effectively extract light (evanescent wave) that is radiated from the optical waveguide 2. In this case, it is necessary to set a refractive index of the high-refractive-index film to be higher than a refractive index of the optical waveguide 2 and lower than a refractive index of a light-receiving element substrate. In addition, for example, as disclosed in Japanese Laid-open Patent Publication No. 2013-80009, a groove or a reflective member may be disposed in the substrate 1 (or the optical waveguide 2 and the like), and a part of an optical signal may be guided to the light-receiving element side through reflection.

The optical modulator shown in FIG. 1 includes the two optical modulation sections M1 and M2, which apply a modulation signal to the modulation electrode and perform optical modulation, in parallel to each other. The optical modulation sections M1 and M2 perform optical modulation by using modulation signals different from each other, and are configured to independently perform a bias control of the modulation signals. In the configuration in which the optical modulation sections are provided in parallel to each other, it is not required for positions in a light wave propagating direction (right and left direction in FIG. 1) to match each other, and the positions in the light wave propagating direction may deviate from each other.

Furthermore, the optical modulation sections which perform optical modulation by using modulation signals different from each other are not limited to the optical modulation sections each being formed with one Mach-Zehnder type optical waveguide as illustrated in FIG. 1. That is, for example, it is possible to use optical modulation sections having various shapes such as an optical modulation section formed as a nest-type optical waveguide in which two Mach-Zehnder type optical waveguides are disposed in a nest shape, and an optical modulation section in which two nest-type optical waveguides are additionally disposed in a nest shape.

The light-receiving element 3, which is shared by the optical modulation sections M1 and M2, is disposed in the substrate 1 in a region on the downstream side of the optical modulation sections M1 and M2. In the example illustrated in FIG. 1, the light-receiving element 3 is disposed between an output waveguide 21 that guides an optical signal modulated in the optical modulation section M1 to an output side of the optical modulator, and an output waveguide 22 that guides an optical signal modulated in the optical modulation section M2 to the output side of the optical modulator. In this example, as the substrate 1, a substrate having a thickness of 20 μm or less is used, but the thickness of the substrate is arbitrarily set.

A monitoring waveguide 23, which extracts a part of an optical signal modulated in the optical modulation section M1, is provided in the output waveguide 21. The monitoring waveguide 23 is formed to guide an optical signal, which is extracted from the output waveguide 21, to the light-receiving element 3.

In addition, a monitoring waveguide 24, which extracts a part of an optical signal modulated in the optical modulation section M2, is provided in the output waveguide 22. The monitoring waveguide 24 is formed to guide an optical signal, which is extracted from the output waveguide 22, to the light-receiving element 3.

Figure 3:
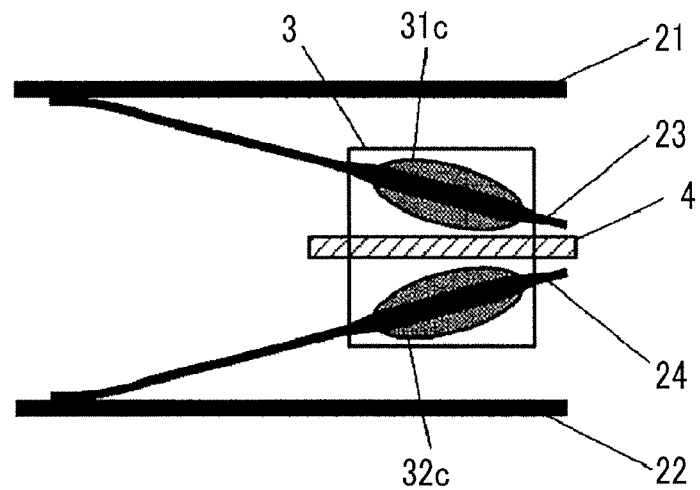
FIG. 3 is an enlarged plan view of a light-receiving element portion according to a modification example.

As illustrated in FIG. 2, the light-receiving element 3 includes a light-receiving section 31 that detects an optical signal output from the optical modulation section M1, and a light-receiving section 32 that detects an optical signal output from the optical modulation section M2. In this example, as the light-receiving section 31, two light-receiving sections 31a and 31b are provided along the monitoring waveguide 23 with respect to the optical modulation section M1, and as the light-receiving section 32, two light-receiving sections 32a and 32b are provided along the monitoring waveguide 24 with respect to the optical modulation section M2. Furthermore, the number of the light-receiving sections or disposition thereof is set in an arbitrary manner as long as the optical signal output from each of the optical modulation sections provided in the substrate 1 can be detected. For example, FIG. 3 illustrates one light-receiving section 31c or 32c, each having a shape elongated in a direction along the monitoring waveguide 23 or 24 as another example of the light-receiving section.

As described above, in the optical modulator according to this example, one light-receiving element 3 is disposed with respect to the substrate 1, and the light-receiving section 31 with respect to the optical modulation section M1 and the light-receiving section 32 with respect to the optical modulation section M2 are provided to the light-receiving element 3. That is, the one light-receiving element 3 is shared by the two optical modulation sections M1 and M2. According to this, it is possible to provide an optical modulator in which an increase in substrate size is greatly suppressed in comparison to a case where one light-receiving element is provided for each optical modulation section.

Furthermore, the monitoring waveguides 23 and 24 are formed in such a manner that an interval between the waveguides becomes narrower until reaching a region of the light-receiving section 31 and the light-receiving section 32. In addition, the light-receiving element 3 is disposed at a position after an interval between the monitoring waveguides 23 and 24 becomes narrower. That is, when the interval between the monitoring waveguides 23 and 24 on a light-receiving element 3 side is set as L1, and the interval between the monitoring waveguides 23 and 24 on a signal input side is set as L2, the monitoring waveguides 23 and 24 are formed to satisfy a relationship of L1<L2. According to this, it is possible to reduce the size of the light-receiving element 3, and thus this is effective for a reduction in size of the substrate 1.

The monitoring waveguides 23 and 24 in FIG. 2 are formed to be close to each other in a gentle curve shape in a region in immediately front of the light-receiving element 3 and to be approximately parallel straight lines after the interval is narrowed to L1, but other shapes do not matter. That is, for example, similar to a modification example illustrated in FIG. 3, the monitoring waveguides 23 and 24 may be formed to be linearly close to each other.

Here, in a case where the interval L1 between the light-receiving section 31 and the light-receiving section 32 in the light-receiving element 3 is narrow, there is a concern that crosstalk of light may occur between the monitoring waveguide 23 that receives light in the light-receiving section 31 and the monitoring waveguide 24 that receives light in the light-receiving section 32. Accordingly, it is preferable to provide optical crosstalk prevention means 4, which prevents crosstalk of light, between the monitoring waveguides 23 and 24. Examples of a configuration of the optical crosstalk prevention means 4 include a configuration in which any one of a groove, a slab waveguide, a metal member, and an electrode is formed between the monitoring waveguides 23 and 24 in the substrate 1. According to this, even when the light-receiving section 31 and the light-receiving section 32 are made to be close to each other, it is possible to prevent the crosstalk of light between the monitoring waveguides 23 and 24, and thus it is possible to further reduce the size of the light-receiving element 3. As a result, it is possible to realize an additional reduction in size of the substrate 1. Furthermore, the optical crosstalk prevention means for prevention of the crosstalk of light may be provided on a light-receiving element side.

In addition, as illustrated in FIG. 2 and FIG. 3, it is preferable that a width of waveguide of the monitoring waveguides 23 and 24 in the region of the light-receiving sections 31 and 32 is greater than a width of waveguide before reaching the region. According to this, in the light-receiving sections 31 and 32 of the light-receiving element 3, it is possible to effectively receive an optical signal output from the optical modulation section M1 and an optical signal output from the optical modulation section M2.

Here, in the above description, a light-receiving element is provided for the monitoring waveguide configured to extract a part of an optical signal output from the output waveguide and to allow the extracted optical signal to propagate therethrough, but there is no limitation thereto.

Figure 4:
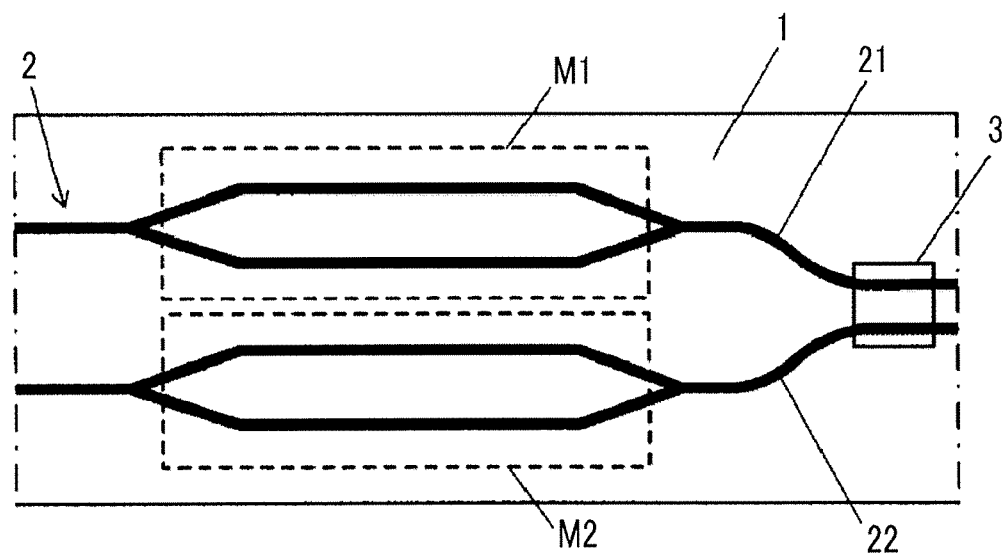
FIG. 4 is a plan view illustrating an example of providing a light-receiving element in an output waveguide.

For example, the light-receiving element may be provided to receive an optical signal itself that propagates through the output waveguide. That is, as illustrated in FIG. 4, the light-receiving element 3 is disposed across the output waveguide 21 of the optical modulation section M1 and the output waveguide 22 of the optical modulation section M2. In addition, the light-receiving element 3 is configured to receive a part of an optical signal that propagates through the output waveguide 21, and a part of an optical signal that propagates through the output waveguide 22. In this case, the output waveguide 21 and the output waveguide 22 are formed in such a manner that an interval therebetween becomes gradually narrower, and the light-receiving element 3 is provided at a site at which the output waveguide 21 and the output waveguide 22 are close to each other to a certain extent. According to this, it is possible to reduce the size of the light-receiving element 3. Furthermore, when desiring to extracting a part of an optical signal output from the output waveguide 21 or 22 and receiving the extracted optical signal with the light-receiving element 3, a groove or a reflective member may be provided at a part of a cross-section of the output waveguide. In this case, apart of an optical signal, which propagates through the output waveguide, may be extracted through reflection, and the extracted optical signal may be received with the light-receiving element.

Figure 5:
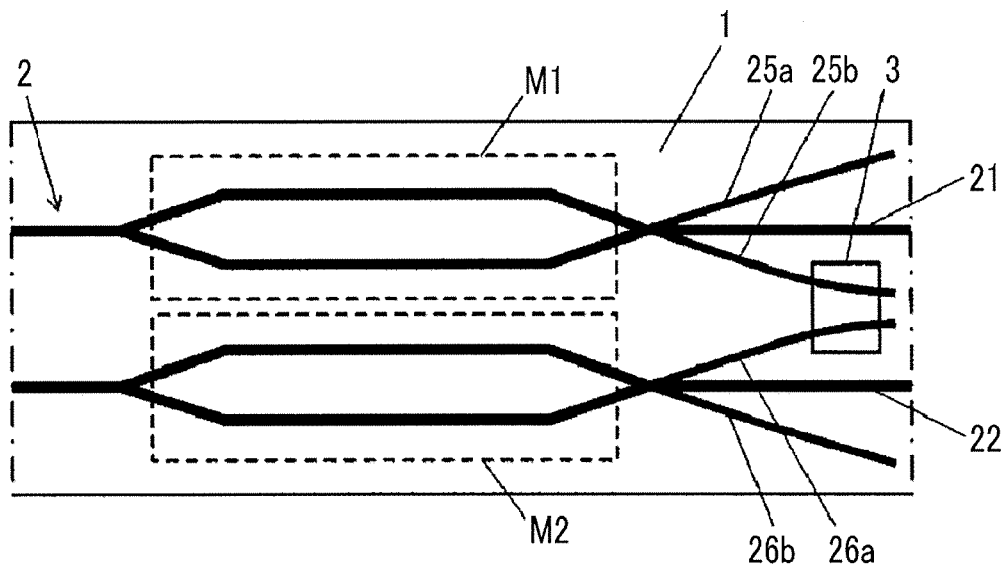
FIG. 5 is a plan view illustrating an example in which a light-receiving element is provided in a radiated-light waveguide.

In addition, for example, in a structure in which a multiplexing section of a Mach-Zehnder type optical waveguide, which constitutes an optical modulation section, is connected to the output waveguide, radiated light that is radiated from the multiplexing section may be detected as an optical signal. That is, as illustrated in FIG. 5, radiated-light waveguides 25a and 25b, which guide radiated light from a multiplexing section of the optical modulation section M1, is provided with the output waveguide 21 of the optical modulation section M1 interposed therebetween. In addition, radiated-light waveguides 26a and 26b, which guide radiated light from a multiplexing section of the optical modulation section M2, is provided with the output waveguide 22 of the optical modulation section M2 interposed therebetween. In addition, the light-receiving element 3 is disposed across the radiated-light waveguide 25b on an optical modulation section M2 side in the radiated-light waveguides 25a and 25b of the optical modulation section M1, and the radiated-light waveguide 26a on an optical modulation section M1 side in the radiated-light waveguides 26a and 26b of the optical modulation section M2. In addition, the light-receiving element 3 is configured to receive radiated light that propagates through the radiated-light waveguide 25b, and radiated light that propagates through the radiated-light waveguide 26a. In this case, the radiated-light waveguide 25b and the radiated-light waveguide 26a are formed in such a manner that an interval therebetween becomes gradually narrower, and the light-receiving element 3 is provided at a site at which the radiated-light waveguide 25b and the radiated-light waveguide 26a are close to each other to a certain extent. According to this, it is possible to reduce the size of the light-receiving element 3.

In addition, description has been given of an optical modulator in which two optical modulation sections M1 and M2 and one light-receiving element are provided in one substrate, and the one light-receiving element 3 is shared by the two optical modulation sections M1 and M2, but the invention is also applicable to an optical modulator in which more optical modulation sections are provided in one substrate.

Figure 6:
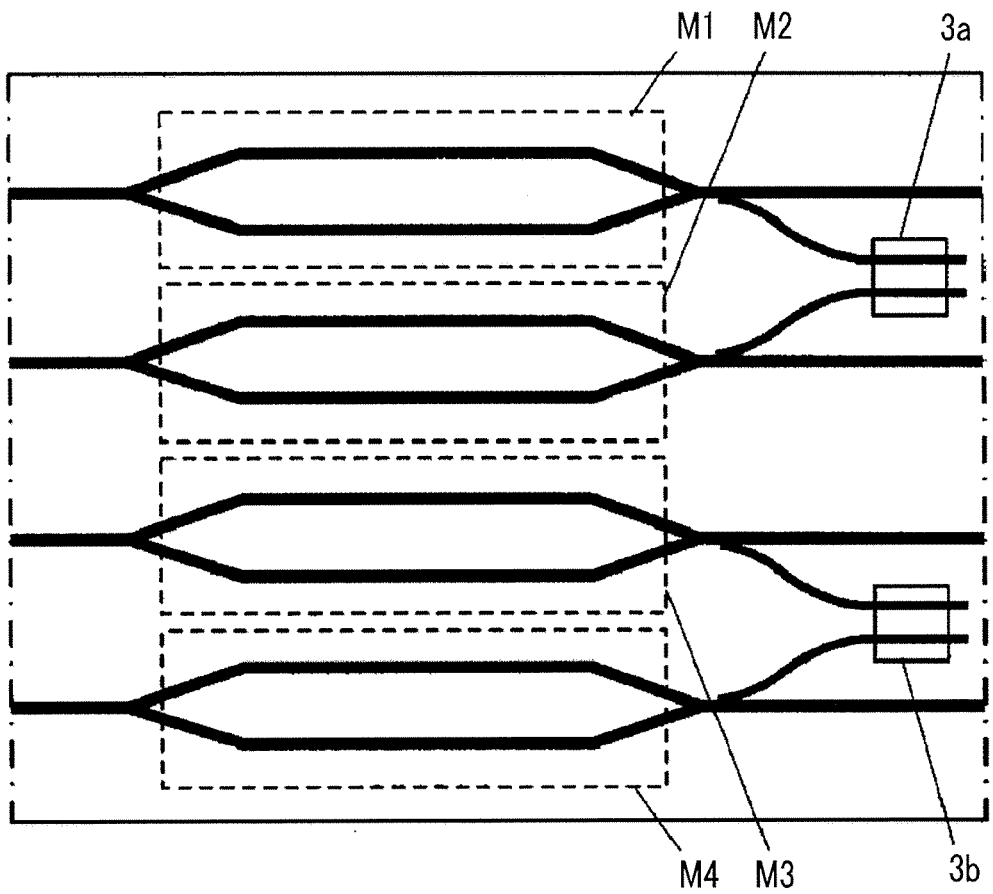
FIG. 6 is a plan view illustrating an example in which structures of sharing one light-receiving element between two optical modulation sections are provided in parallel to each other.

For example, as illustrated in FIG. 6, in a case where four optical modulation sections M1, M2, M3, and M4 are formed in parallel to each other in one substrate, a first light-receiving element 3a is shared by the optical modulation sections M1 and M2, and a second light-receiving element 3b is shared by the optical modulation sections M3 and M4. In this case, the first light-receiving element 3a is disposed to vertically cross a monitoring waveguide with respect to an output waveguide of the optical modulation section M1, and a monitoring waveguide with respect to an output waveguide of the optical modulation section M2. In addition, a light-receiving section may be provided to the first light-receiving element 3a in each region corresponding to each of the monitoring waveguides for the optical modulation sections M1 and M2. In addition, the second light-receiving element 3b is disposed to vertically cross a monitoring waveguide for an output waveguide of the optical modulation section M3, and a monitoring waveguide for an output waveguide of the optical modulation section M4. In addition, a light-receiving section may be provided in the second light-receiving element 3b in each region corresponding to each of the monitoring waveguides for the optical modulation sections M3 and M4.

In addition, for example, one light-receiving element may be provided to be shared by the optical modulation sections M2 and M3, and a light-receiving element may be individually provided in the optical modulation sections M1 and M4.

Figure 7:
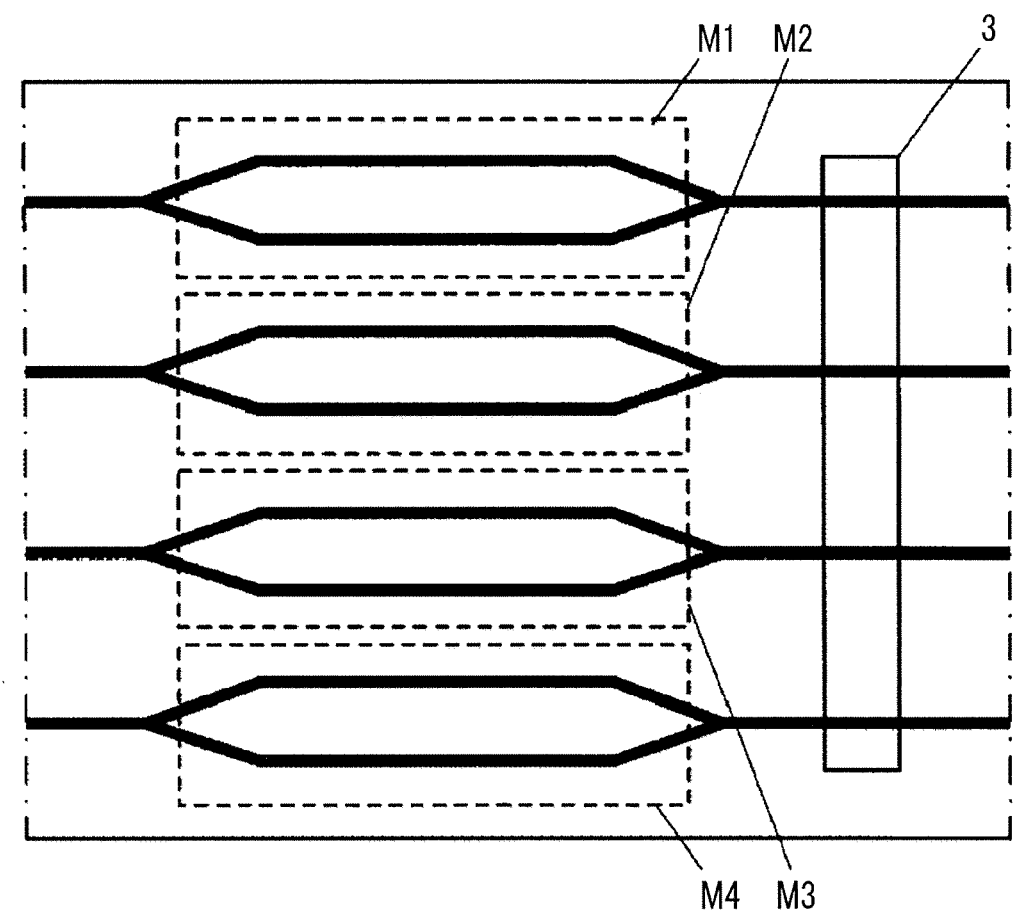
FIG. 7 is a plan view illustrating an example in which one light-receiving element is shared by four optical modulation sections.

In addition, for example, in a case where four optical modulation sections M1, M2, M3, and M4 are provided in parallel to each other in one substrate, one light-receiving element may be configured to be shared by all of the optical modulation sections M1 to M4. That is, as illustrated in FIG. 7, one light-receiving element 3 is provided to vertically cross respective output waveguides of the optical modulation sections M1 to M4. In addition, the light-receiving section may be provided to the light-receiving element 3 in a region corresponding to each of the output waveguides of the optical modulation sections M1 to M4.

Next, description will be given of devise of accurately disposing the light-receiving element 3 with respect to the substrate 1.

Figure 8:
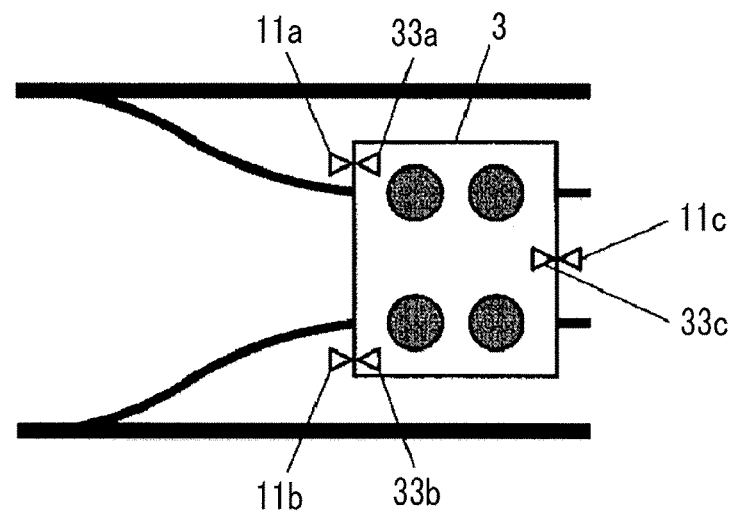
FIG. 8 is a plan view illustrating an example of a mark that is provided in a substrate and a light-receiving element.

FIG. 8 is a plan view illustrating an example of providing a mark in the substrate 1 and the light-receiving element 3. The mark specifies a position (predetermined position) at which the light-receiving element 3 is disposed with respect to the substrate 1.

Marks 33a and 33b are provided in the light-receiving element 3 at both end positions of an edge on an upstream side, and a mark 33c is provided at a central position of an edge on a downstream side of the light-receiving element 3. In addition, marks 11a, 11b, and 11c, which respectively correspond to the marks 33a, 33b, and 33c of the light-receiving element 3, are provided in the substrate 1 as a mark indicating an arrangement position of the light-receiving element 3. In addition, when disposing the light-receiving element 3 on the substrate 1, the light-receiving element 3 is disposed in such a manner that the mark 11a, the mark 11b, and the mark 11c respectively face the mark 33a, the mark 33b, and the mark 33c. According to this, it is possible to accurately dispose the light-receiving element 3 with respect to the substrate 1. Furthermore, each of the marks which are provided in the substrate 1 can be formed by various methods. For example, the mark can be formed by disposing an electrode in the substrate 1 in a predetermined shape, or by thermally diffusing Ti in the substrate 1 in a predetermined shape. In addition, each of the marks which are provided in the light-receiving element 3 also can be formed by various methods.

Figure 9:
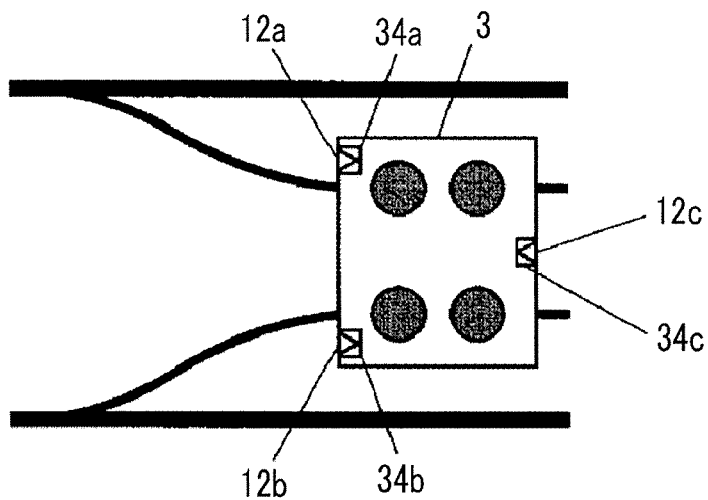
FIG. 9 is a plan view illustrating another example of the mark that is provided in the substrate and the light-receiving element.

FIG. 9 is a plan view illustrating another example of the mark that is provided in the substrate 1 and the light-receiving element 3.

Notches 34a and 34b are provided in the light-receiving element 3 at both end positions of an edge on an upstream side, and a notch 34c is provided at a central position of an edge on a downstream side of the light-receiving element 3. In addition, marks 12a, 12b, and 12c, which respectively correspond to the notches 34a, 34b, and 34c of the light-receiving element 3, are provided in the substrate 1 as a mark indicating an arrangement position of the light-receiving element 3. In addition, when disposing the light-receiving element 3 in the substrate 1, the light-receiving element 3 is disposed in such a manner that the mark 12a is exposed from the notch 34a, the mark 12b is exposed from the notch 34b, and the mark 12c is exposed from the notch 34c. According to this, it is possible to accurately dispose the light-receiving element 3 with respect to the substrate 1.

Figure 10:
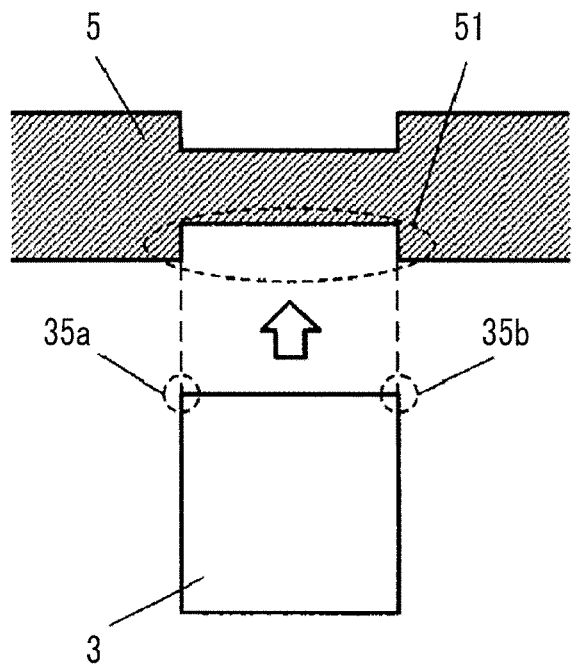
FIG. 10 is a plan view illustrating an example of using an electrode that is wired in the substrate as the mark.

FIG. 10 is a plan view illustrating an example of using an electrode that is wired in the substrate 1 as a mark.

In the drawing, an electrode 5, which is wired in the substrate 1, has a planar shape in which a rectangular concave portion 51 is provided in a part. In addition, the light-receiving element 3 is disposed in such a manner that corners 35a and 35b of a side along the electrode 5 of the light-receiving element 3 are fitted into the concave portion 51 of the electrode 5. According to this, it is possible to accurately dispose the light-receiving element 3 with respect to the substrate 1.

Figure 11:
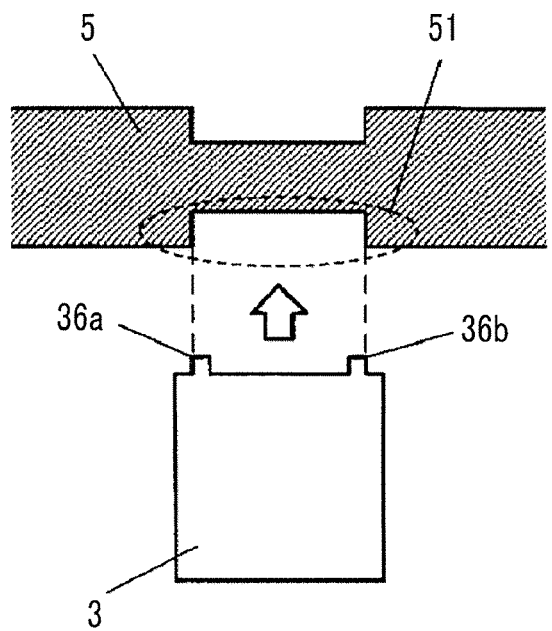
FIG. 11 is a plan view illustrating another example of using the electrode that is wired in the substrate as the mark.

FIG. 11 is a plan view illustrating another example of using the electrode, which is wired in the substrate 1, as the mark. In the drawing, the electrode 5, which is wired in the substrate 1, has a planar shape in which a rectangular concave portion 51 is provided in a part. In addition, two protrusions 36a and 36b are provided on a side along the electrode 5 of the light-receiving element 3. In addition, the light-receiving element 3 is disposed in such a manner that the protrusions 36a and 36b of the light-receiving element 3 are fitted into the concave portion 51 of the electrode 5. According to this, it is possible to accurately dispose the light-receiving element 3 with respect to the substrate 1.

Furthermore, configurations illustrated in FIGS. 8 to 11 are illustrative only, and it is possible to use marks of various shapes and aspects.

Hereinbefore, description has been given of an optical modulator in which a plurality of optical modulation sections are provided in one sheet of substrate as an example, but the invention is also applicable to a multi-element structure optical modulator including a plurality of substrates in which a plurality of optical modulation sections are provided. In addition, the invention is also applicable to a configuration in which light waves having wavelengths different from each other are optically modulated in the plurality of optical modulation sections.

In addition, as the optical modulation sections, it is possible to employ optical modulation sections having various shapes such as an optical modulation section formed with one Mach-Zehnder type optical waveguide, an optical modulation section formed as a nest-type optical waveguide in which two Mach-Zehnder type optical waveguides are disposed in a nest shape, and an optical modulation section in which two nest-type optical waveguides are additionally disposed in a nest shape. In this case, the light-receiving element may be provided for not only a main modulation section that is constituted by a Mach-Zehnder type optical waveguide on an outer side but also a sub-modulation section that is constituted by a Mach-Zehnder type optical waveguide on an inner side.

Hereinbefore, the invention has been described on the basis of examples. However, the invention is not limited to the above description, and it is needless to say that appropriate design modifications can be made in a range not departing from the gist of the invention.

As described above, according to the invention, in a case where optical modulation is performed by applying a modulation signal, which is different for each of a plurality of optical modulation sections provided in one substrate, to a modulation electrode, it is possible to provide an optical modulator in which an increase in size of the substrate is further suppressed in comparison to a case of providing the light-receiving element for each optical modulation section.

What is claimed is:
1. An optical modulator, comprising:
a substrate having an electro-optic effect;
an optical waveguide that is formed in the substrate; and
a modulation electrode for modulating a light wave that propagates through the optical waveguide,
wherein a first optical modulation section and a second optical modulation section use modulation signals different from each other when applying a modulation signal to the modulation electrode and performing optical modulation,
a light-receiving element is disposed on the substrate, and
the light-receiving element has a first light-receiving section that detects an optical signal propagating through a first waveguide which guides the optical signal output from the first optical modulation section, and a second light-receiving section that detects an optical signal propagating through a second waveguide which guides the optical signal output from the second optical modulation section.

2. The optical modulator according to claim 1, wherein the first waveguide and the second waveguide are configured in that an interval between the first waveguide and the second waveguide becomes narrower until reaching a region of the first light-receiving section and the second light-receiving section.

3. The optical modulator according to claim 1, wherein in the first waveguide and the second waveguide, a width of waveguide in a region of the first light-receiving section and the second light-receiving section is greater than a width of waveguide before reaching the region.

4. The optical modulator according to claim 1,
wherein in the substrate, any one of a groove, a slab waveguide, a metal member, and an electrode is formed between the first waveguide and the second waveguide so as to prevent optical crosstalk between the first waveguide and the second waveguide.

5. The optical modulator according to claim 1,
wherein a mark for arranging the light-receiving element at a predetermined position on the substrate is formed on at least one of the light-receiving element and the substrate.

6. The optical modulator according to claim 1,
wherein the first optical modulation section and the second optical modulation section are configured by using at least one Mach-Zehnder type optical waveguide, and the first optical modulation section and the second optical modulation section are arranged in parallel to each other.

7. The optical modulator according to claim 1,
wherein the first waveguide is configured to extract apart of an optical signal output from an output waveguide guiding the optical signal that is modulated in the first optical modulation section, and to derive the extracted optical signal toward the first light-receiving section, and the second waveguide is configured to extract a part of an optical signal output from an output waveguide guiding the optical signal that is modulated in the second optical modulation section, and to derive the extracted optical signal toward the second light-receiving section.

* * * * *